United States Patent [19]

Plust et al.

[11] 4,117,206
[45] Sep. 26, 1978

[54] NICKEL OXIDE-HYDROGEN CELL

[75] Inventors: Heinz Plust, Neuhausen; Günter Gutmann, Esslingen, both of Germany

[73] Assignee: Deutsche Automobilgesellschaft GmbH, Esslingen-Mettingen, Germany

[21] Appl. No.: 825,461

[22] Filed: Aug. 17, 1977

[30] Foreign Application Priority Data

Aug. 17, 1976 [DE] Fed. Rep. of Germany ....... 2637015

[51] Int. Cl.² .......................................... H01M 10/34
[52] U.S. Cl. ..................................... 429/101; 429/223
[58] Field of Search ................... 429/101, 223, 27, 12, 429/59, 188

[56] References Cited

U.S. PATENT DOCUMENTS

| | | | |
|---|---|---|---|
| 3,669,744 | 6/1972 | Tsenter et al. | 429/101 |
| 3,850,694 | 11/1974 | Dunlop et al. | 429/27 X |
| 3,867,199 | 2/1975 | Dunlop et al. | 429/59 X |
| 3,990,910 | 11/1976 | Giner et al. | 429/59 |

*Primary Examiner*—Anthony Skapars
*Attorney, Agent, or Firm*—Browdy and Neimark

[57] ABSTRACT

Nickel/hydrogen cells have a long cycle life and other attributes making them desirable for electric vehicle applications, but their cost is high. Cost reduction is obtained by the use of positive electrodes with high capacity per unit area, e.g. porous sintered nickel oxide electrodes, which contain absorbed therein major quantities of the electrolyte. The structure of positive and hydrophilic negative electrodes and of separators is specially adapted for this purpose.

14 Claims, 5 Drawing Figures

NICKEL OXIDE-HYDROGEN CELL

FIELD OF THE INVENTION

The invention relates to batteries and, more particularly, to rechargeable nickel oxide-hydrogen cells with positive electrodes with a high capacity per unit area.

For an improved understanding of the function of these cells, the reaction will be described at this point, and is represented by the following equations:

BACKGROUND OF THE INVENTION

Two types of secondary batteries have been developed within the last ten years, containing NiOOH electrodes as the positive electrodes and hydrogen electrodes as the negative electrodes. The first system (cf. eg. Swiss Pat. No. 495,060, German Offenlegungsschrift No. 2,160,202, German Offenlegungsschrift No. 2,200,806) is characterized by the fact that the negative electrode is designed as a hydrogen storage electrode; these cells do not require a pressure housing and usually operate with an alkaline electrolyte moving freely about the cell.

Nickel oxide-hydrogen cells are also known (German Auslegeschrift No. 2,111,172, U.S. Pat. No. 3,867,199) in which hydrogen is stored under pressure in the cell housing or in metal hydrides inside or outside the cell housing. Cells according to this second system therefore require a pressure-resistant housing which is impermeable to $H_2$; the negative electrode acts as a catalyzing electrode, as is known in fuel cells. Under all operating conditions, it is important for its function that the alkaline electrolyte be in the separator and in the electrodes. The present invention relates to this second type of nickel oxide-hydrogen cell.

Since the original work done by Tsenter et al. (German Auslegeschrift No. 2,111,172, U.S. Pat. No. 3,669,744) and Dunlop et al. (U.S. Pat. No. 3,867,199) in 1971 and 1972, these nickel oxide-hydrogen cells have been of particular interest for special applications. Their advantages include good reliability and freedom from maintenance, long life-time, good power rating, and an energy content of 40–70 Wh/Kg; their disadvantages include the high cost, due to the plurality of expensive hydrogen electrodes catalyzed with noble metals, the equally costly positive electrodes, and the costly (by comparison with other known batteries) pressure housing. For this reason, such nickel oxide-hydrogen cells have thus far only been used to a very limited extent despite their good operating characteristics.

It is apparent from the reaction equations that the hydrogen pressure in the cell is proportional to the state of charge and is therefore readily measured, another advantage of the system. It is also clear that when the cell is overcharged or the polarity is reversed, no change occurs in the hydrogen pressure, except for that produced by temperature changes in the cell. If a battery is assembled with discharged positives and a low hydrogen precharge is provided, the system will be largely resistant to polarity reversal until the positives are damaged.

Previous embodiments of this type of cell have been disclosed as the state of the art, based primarily upon the previously cited fundamental patents:

1. The cell described by Tsenter et al. is characterized by high operating pressure, which can reach approximately 60–200 bars, and also a thickness ratio of the negative to the positive electrode of 1:1 to 1:20, and also by the fact that the pore volume of electrode stack is filled 50–90% with electrolyte.

2. The cell described later by Dunlop et al. is characterized by hydrophobic negative electrodes, which can be biporous, and also by protection against polarity reversal by provision of a hydrogen precharge, as well as a volume of electrolyte which is not sufficient to flood the electrodes in the electrode stack.

All previously published practical embodiments of nickel oxide-hydrogen cells, including those of NASA-COMSAT, Tyco Labs., Eagle-Picher, ERC (Energy Research Corporation) and SAFT (Societe des Accumulateurs Fixes et de Traction) correspond to this embodiment.

The disadvantage of the cell, numbered 1 above, is the high operating pressure, which makes necessary a corresponding pressure housing and results in a decrease in energy density per unit weight. Another disadvantage of the high pressure, which is obviously necessary to allow the negative electrodes to function, is a higher rate of self-discharge of the cells, since this is proportional to the hydrogen pressure.

On the other hand, the cell described under No. 2 above has the advantage that the reaction zone in the negative electrode, the zone in which hydrogen gas, electrolyte, and catalyst-coated electrode structure come together, is defined by hydrophobization. The negative electrode therefore operates satisfactorily even at lower hydrogen pressures (with correspondingly lower solubility of the hydrogen in the electrolyte). Cells manufactured heretofore according to this design were designed for a maximum operating pressure of 34–40 bars.

In addition to the advantages described, such negative electrodes when used in nickel oxide-hydrogen cells suffer from certain disadvantages: It is generally known that hydrophobized electrodes "age", i.e. the degree of power capability of the electrodes decreases with operating time. The reaction zone, the location of the electrochemical reaction, is displaced with increasing age of the cell, and results in a decrease in the power rating. Another disadvantage, which appears especially in the nickel oxide-hydrogen cells of the type described under No. 2 above, is that the separators "dry out" with increasing operating time. This can be attributed for example to the fact that the electrolyte, which emerges from the electrode units through the hydrophobized back side, i.e. the side of the hydrogen electrode which delimits the gas chamber — this phenomenon is called the "weeping" of the electrodes — is irreversibly lost, since the hydrophobization prevents such electrolyte from returning into the electrode stack.

Another influence that contributes to limiting the lifetime of previously known nickel oxide-hydrogen cells is the swelling of the positive electrodes. Thus, an increase in the thickness of positive electrodes amounting to 40–70% in the course of 1,000 cycles has been reported, leading to a reduction of the utilization of active mass in the nickel oxide electrode and an increase in the ohmic resistance. This swelling, in fact, can be eliminated by a volume of active mass which is reduced relative to the volume of the positive electrode, but it is obvious that this measure also undesirably reduces the energy density of the cell as a whole.

SUMMARY OF THE INVENTION

The present invention is intended to eliminate these above described disadvantages of the cell described above as well. The invention provides a nickel oxide-hydrogen cell which permits the use of high power capacity, nonhydrophobized hydrogen electrodes at a maximum operating pressure of approximately 30–70 bars, and is also cheaper to manufacture than previously known cells of this type.

Therefore, objects of the present invention are to improve further the operating characteristics of nickel/-hydrogens cells relative to known cells of this type, to eliminate the disadvantages of such known cells, and to provide for cheaper manufacture of nickel oxide-hydrogen cells. Another object is to provide for improved nickel/hydrogen cells, and a further object is to provide a superior rechargeable-nickel oxide/hydrogen cell having positive electrodes with a high capacity per unit area.

According to the invention, these and other objectives are achieved by the application of positive and negative electrodes whose structure has been modified for use in nickel oxide-hydrogen cells. There is thus provided in a rechargeable nickel-hydrogen cell with hydrogen pressure storage or hydride storage and one or more electrode units connected electrically in parallel or in series then called electrode stack, in each unit a positive nickel oxide electrode surrounded on both sides by negative hydrophilic hydrogen electrodes and separated therefrom by electrolyte-saturated separators, the electrode units each containing gas-permeable separating elements between the adjacent negative electrodes. The totality of electrodes and electrode units, resp. in a common housing is designated as call stack. Capillary pressure of the electrolyte in the pores of the positive electrodes in every operating state of the cell is less than the capillary pressure of the electrolyte in the separator and greater than the capillary pressure of the electrolyte in the negative electrode. The separating elements can be electrically conducting or nonconducting.

BRIEF DESCRIPTION OF THE DRAWINGS

For a better understanding of the invention, possible embodiments thereof will now be described with reference to the attached drawings, it being understood that these embodiments are intended as merely exemplary and in no way limitative.

The properties of the electrodes may be described as follows:

Catalyzing electrodes for conversion of gaseous reactants, in order to achieve a high power capacity, must have the maximum possible phase boundary area between the gas electrolyte and catalyst. The fixation or localization of this reaction zone can occur by:

(a) Hydrophobization of the electrode.*

(b) Development of a pressure differential corresponding to the capillary pressure, between the gas and electrolyte sides of the electrode.

(c) Determination of the capillary activity (pore distribution) and volume of electrolyte in the electrode and the electrolyte matrix.

\* The wettability of a solid surface is defined by the wetting angle $\theta$: for $\theta > 90°$, the surface is considered hydrophobic while when $\theta < 90°$ it is hydrophilic.

Case (a) corresponds to the unsatisfactory state of the art as described. Case (b), known from fuel cells, is not applicable to nickel oxide-hydrogen cells whose cell housings simultaneously serve as hydrogen pressure storage units; all of the components in the cell are subject to the same pressure.

Case (c) is the case by which it is desirable to solve the problem according to the invention. It requires an adjustment of the pore radius of the components in order to achieve a sufficient current capability or power rating, and an exact control of the volume of electrolyte. A somewhat similar solution is known for fuel cells; however, in secondary batteries different conditions prevail. Fuel cells are characterized by the fact that the reactants are continuously brought to the electrodes and the reaction products are carried continuously away. Therefore, fuel cells can be controlled in such manner that the concentrations of anolyte and catholyte are always approximately constant and therefore their surface tension, which is proportional to the capillary pressure in the pores, remains constant as well.

In secondary batteries, however, the reaction products remain in the cell; they constitute the active mass of the electrodes. When current flows in the cell, changes in the concentration of the electrolyte occur in the electrodes: In nickel oxide cadmium cells, depending on the state of charge, KOH molarities between < 2 and 9 have been measured in the nickel oxide electrodes. Since the active masses have different volumes in the charged and discharged states, there are changes in both concentration and volume in the electrodes of secondary cells. In contrast to $O_2/H_2$ fuel cells, these must be controlled in nickel oxide-hydrogen cells.

If the concentration changes in nickel oxide-hydrogen cells are calculated using the transport numbers for $OH^-$ and $K^+$, during charging when 4 Faraday equivalents pass through the cell, there is a decrease of 1 mole KOH on the positive electrode and an increase of 1 mole KOH on the negative electrode. During discharge, the concentration shifts in the opposite direction. This is particularly important at high power ratings, since the concentration differential produced by transfer, which results in a decrease in cell voltage, can be compensated to a lesser degree by diffusion at high power ratings than at low power ratings.

In order for the electrolyte to remain in the desired amount of the desired point in the electrodes of nickel oxide-hydrogen cells, the capillary forces in the separator must be maximal and in the positives must be between the capillary forces in the separator and the negative electrode; this condition must be preserved under all operating conditions. An example will make this clear.

Figure 1A:
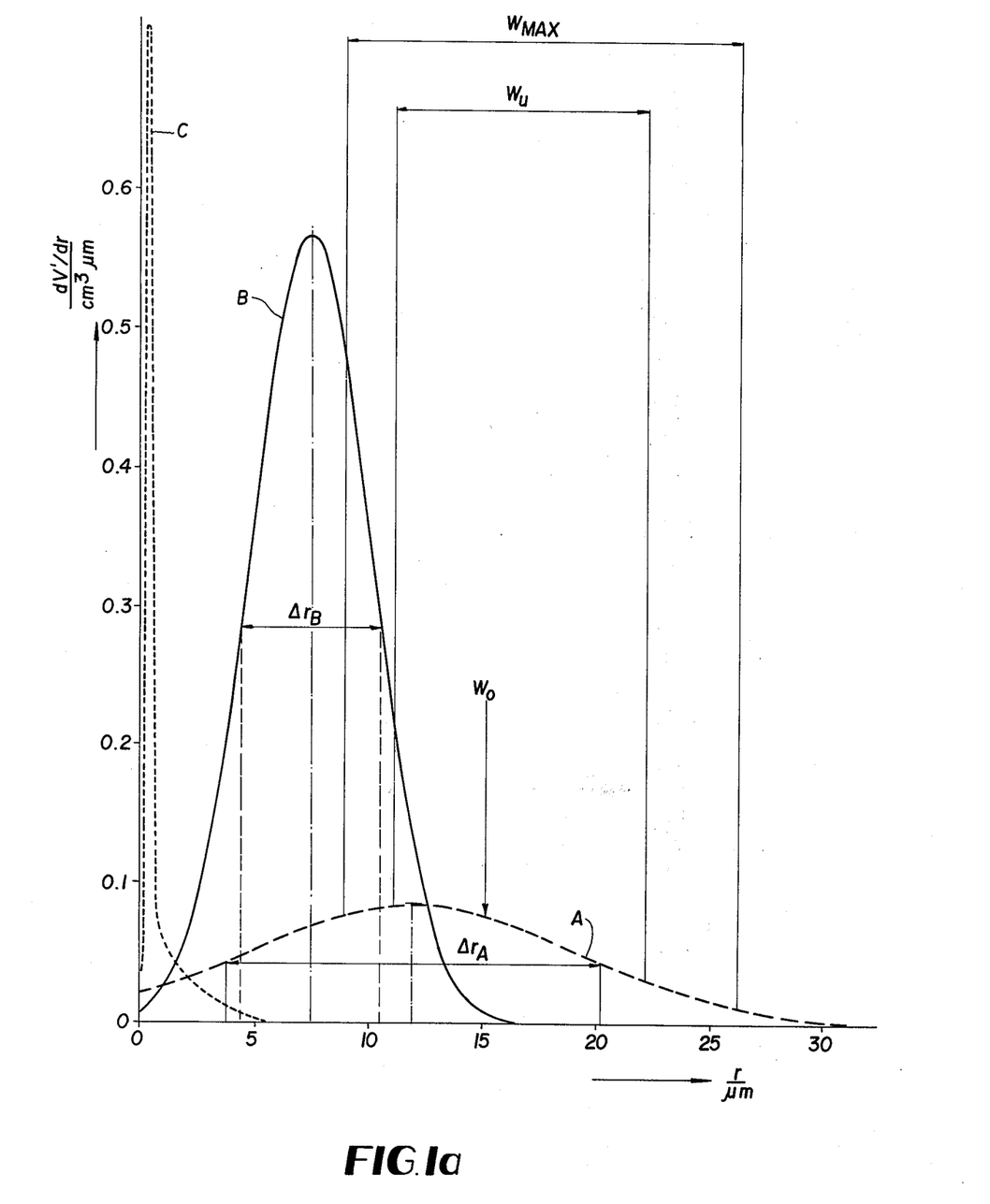
FIG. 1a is a graph of pore frequency distribution for electrodes and the separator of a cell embodiment in accordance with the present invention.

FIG. 1a shows a pore frequency distribution for the positive and negative electrodes and the separator. The differential pore volume is plotted on the ordinate against the pore radius of the components on the abscissa. A represents the pore size distribution of the $H_2$ electrode, B represents that of the nickel oxide electrode, and C represents that of the separator. $W_{max}$ is the maximum operating range, $W_u$ is the usual operating range and $W_o$ the optimum operating point of the $H_2$ electrode. In addition, the half-width value of the pore size distribution for the positive $\Delta r_B$ and negative electrodes $\Delta r_A$ has been plotted. The capillary pressure P in the pores is calculated from the following equation:

$$P = 2K/r$$

where r is the pore radius and K is a constant.

$$K = \alpha \cos \theta$$

where $\alpha$ is surface tension $\theta$ is contact angle

For KOH, $\alpha$ has the value

1 N = 75 dyn/cm

10 N = 100 dyn/cm $\theta$ is 0 for metals.

The following calculations can then be performed:

Asbestos: Pore size 0.5 $\mu$, capillary pressure 3–4 bars

NiOOH: Pore size 7.5 $\mu$, capillary pressure 0.20–0.27 bars

Negative: Pore size 10–22$\mu$, capillary pressure 0.068–0.20 bars.

Therefore, the capillary pressure in the negatives under all conditions remains lower than that in the nickel oxide electrodes, which establishes that the electrode, thanks to its broad operating range due to the uniform distribution of the pore volume of pores between 10 and approximately 25 microns, remains in a good operating condition. Despite the relatively large pores, the active surface and the catalytic activity of the electrode must be sufficient to achieve the desired maximum power rating.

The properties of the electrolyte matrix which acts as a separator as well are relatively uncritical. Its capillary activity, which is the highest of the three components involved in the electrochemical process, creates a situation in which the separator always takes up the maximum amount of electrolyte, and therefore has nearly zero free pore volume available. It is, so to speak, electrolyte-saturated, and can no longer take up any additional electrolyte.

Therefore, the positive electrode must likewise be provided with sufficiently small pores with high capillary forces in order to keep the electrolyte reliable, but simultaneously the negative electrode, with smaller capillary forces, must permit pore diameters which guarantee sufficient power ratings. Such a positive nickel oxide electrode can be manufactured, for example, using a structure described in German Auslegeschrift No. 2,160,201 of the applicant, and providing electrochemical impregnation. It has another advantage: By virtue of its structure, it permits manufacture with capacities per unit cross sectional area of 70–100 mAh/cm$^2$ (corresponding thickness — 2–4mm), whereby its power rating is equal to or only slightly poorer than the commercial nickel oxide sintered plate electrodes, with approximately 35 mAh/cm$^2$ capacity per unit cross sectional area and much better than those of tubular electrodes, with approximately 80 mAh/cm$^2$, which because of their structure cannot be used in nickel oxide-hydrogen cells. Therefore, another goal according to the invention is achieved, since the high capacity per unit area of the positive electrodes means that the price-determining number of individual electrodes, both positives and negatives, can be reduced by half or one-third relative to the state of the art.

The porosity is adjusted so that the average of the pore sizes of the positive electrodes is greater than the average of the pore sizes of the separators and smaller than the average of the pore sizes of the hydrophilic negative electrodes. According to a preferred embodiment, the free pore volume of the positive electorde is 25–55% and that of the negative electrode is 70–85%, and the half-width value of the pore sizes of the negative electrodes is between 3.5 and 50 microns.

Preferably, more than 50% of the total amount of electrolyte contained in the cell is in the positive electrode, especially 50–75%. According to a further specific embodiment, the separator is made of asbestos with an average pore size of approximately 0.5-2 microns. The separating elements between the negative electrodes of adjacent electrode units preferably consist of corrugated plastic netting, which is capable of yielding elastically to a pressure exerted vertically upon its surface, but which can also be rendered conducting, for example by being metallized, or can consist of netting made of a conducting material with an appropriately elastic quality. Preferably, the volume of the pressure housing is 2-8.5 liters per kilogram of the active mass contained in the positive electrode and preferably an electrolyte is used which contains at least 6 moles, especially 7.6-8 moles of KOH and 0.4-0.6 moles of LiOH in 1,000 grams of water, whereby KOH is preferred but can be replaced wholly or in part by NaOH.

A preferred ratio between such mixtures in the case of KOH:NaOH is 80:20 to 20:80. The more NaOH is used, the further the lower limit of the molar range must be adjusted toward the hydroxide, i.e. 6 moles, while as the KOH content increases, the upper limit should be adjusted toward 8 moles.

By reducing the number of positive and negative electrodes, not only is there substantial price reduction, but also a decrease in weight and space requirements which is of great importance from the technological standpoint. Moreover, the cell according to the invention is operationally reliable and much more sturdy than known cells of this type.

The following examples, offered illustratively, further describe the invention.

EXAMPLE 1

Figure 2A:
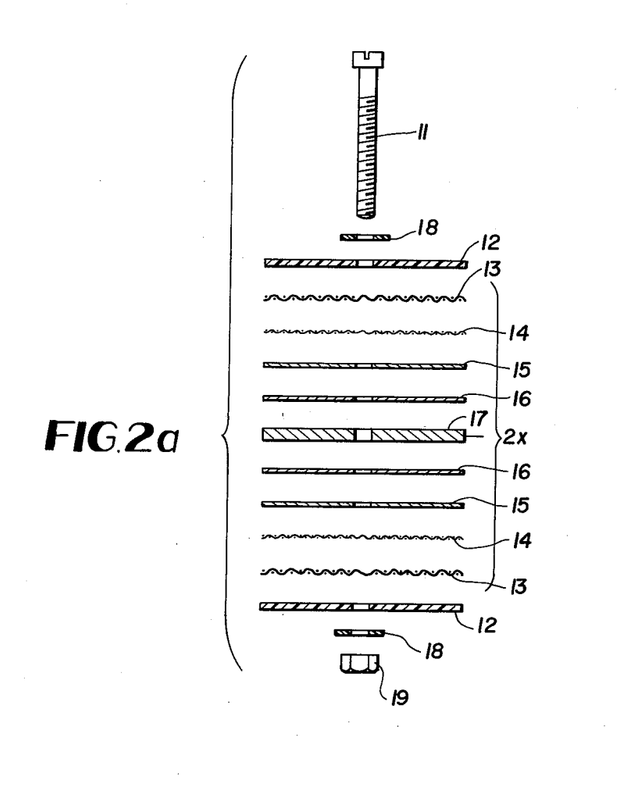
FIG. 2a is an exploded sectional view of a cell in accordance with the present invention.

A nickel oxide-hydrogen cell was assembled from individual components, shown as an exploded view in FIG. 2a.

In FIG. 2a:
11 = Polyethylene screw, M4 thread
12 = End plate made of acrylic resin
13 = Gas-conducting netting (polypropylene fabric, Lamports Company, Cleveland, Ohio)
14 = Nylon netting (nylon-6, Tela filter wire fabric No. 565, Gebr. Kufferath, Duren)
15 = Negative electrode, activated with 1.25mg Pt + 3.75mg Pd/cm$^2$
16 = Fuel cell asbestos, saturated with 0.8 ml 6N KOH
17 = Positive electrode (NiOOH)
18 = washer
19 = nut Two nickel oxide electrodes with structures according to DAS No. 2,160,201, each 4cm in diameter and 2mm thick, were used as the positive electrodes; they were electrochemically impregnated and had a capacity of approximately 70 mAh/cm$^2$ of cross sectional area, measured in a half-cell arrangement with 6 N KOH as the electrolyte. The porosity of the unimpregnated structure was 88%.

Four negative electrodes were each prepared from a sintered nickel structure of 1.1mm thickness, whose porosity was determined according to an electrolyte displacement method. * Most of the pore size values clustered around approximately 10 microns. Disks 4cm in diameter were stamped out of the structure and impregnated with 5mg of Pt + Pd/cm$^2$ (75 weight % of Pd, 25 weight % of Pt).

* See for example: J. M. Thomas and W. J. Thomas, "Introduction to the Principles of Heterogeneous Catalysts", Academic Press, London — New York 1967, 2nd Printing 1969, page 195 et seq. Thus, the sample was filled with electrolyte, covered in one side by an asbestos disc, and exposed to gas pressure on the other side. The displaced electrolyte volume was plotted as a function of gas pressure P. The pore size can be determined by differentiating the resultant function and substituting in the Kelvin equation.

Fuel cell asbestos 0.5mm thick served as a separator and electrolyte matrix. It was saturated with 0.8ml of 6 N KOH before the cell was assembled. Polypropylene fabric approximately 2mm thick was used as the gas-conducting screen, as well as nylon netting approximately 0.5mm thick.

In the sequence shown in FIG. 2a the components described were assembled to form a stack, which was compressed slightly by two acrylic resin plates as the end plates and a central plastic screw. The positive and negative electrodes were connected in parallel. In order to facilitate observation the stack was assembled into a cylindrical pressure vessel made of acrylic resin, which was provided with gas inlet and outlet lines as well as gas-tight piping. The pressure container was flushed with hydrogen gas and finally given a hydrogen pressure of 4 bars which rose during the charging of the cell to 6.9 bars.

The following values were measured on this cell:

| Discharge Time (h) | Average Discharge Voltage (V) | Capacity (Ah) | Wh Charging Efficiency |
|---|---|---|---|
| 6.58 | 1.23 | 1.58 | 0.72 |
| 2.50 | 1.14 | 1.50 | 0.64 |
| 1.20 | 1.03 | 1.44 | 0.55 |
| 0.75 | 0.91 | 1.35 | 0.55 |

The maximum power of the cell was 3.18 W, self-discharge at room temperature after 24 hours was 7%, after 48 hours 9%, and after 96 hours 13%.

This cell was operated for 260 cycles without any change in the measured values.

EXAMPLE 2

Figure 2B:
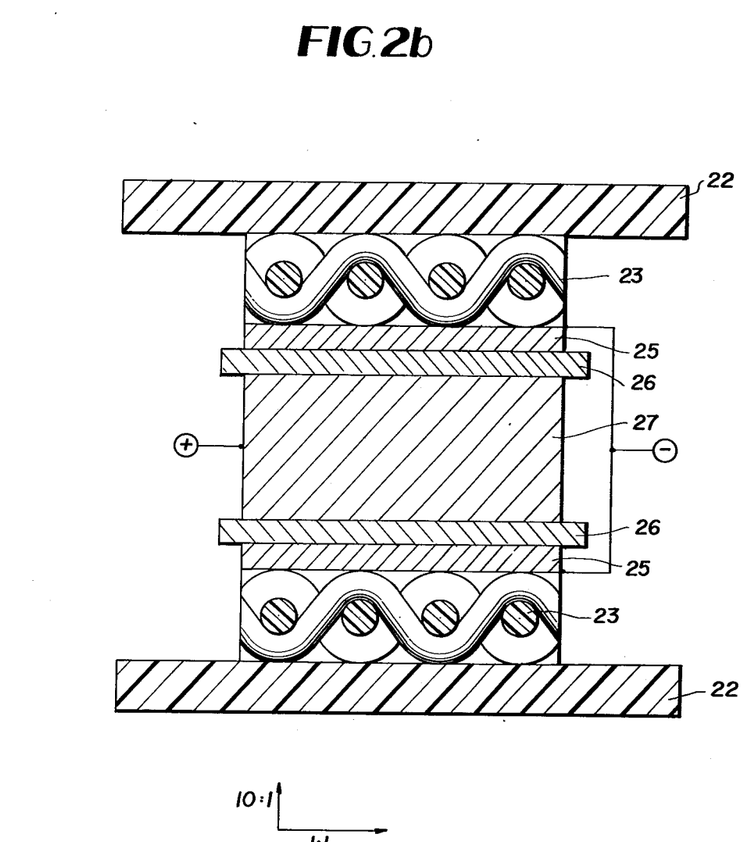
FIG. 2b is a sectional view of another cell embodiment, the pore distribution of which is shown in FIG. 1b.

A cell consisting of a discharged positive electrode with a diameter of 65mm and a thickness of 3mm, prepared from a structure according to DAS No. 2,160,201 by electrochemical impregnation, two negative electrodes 0.6mm thick made of a sintered nickel structure with a porosity of 78%, activated with 5mg Pt + Pd/cm$^2$ (1.75mg Pt + 3.75mg Pd), two asbestos separators 67mm in diameter, and two corrugated pieces of netting made of polypropylene 67mm in diameter were clamped as shown in FIG. 2b between two perforated acrylic resin plates.

In FIG. 2b:
22 = Perforated acrylic resin end plate
23 = Gas-conducting netting (as netting 13 in Example 1)
25 = Negative electrode
26 = Fuel cell asbestos separator
27 = Positive electrode (NiOOH).

Figure 1B:
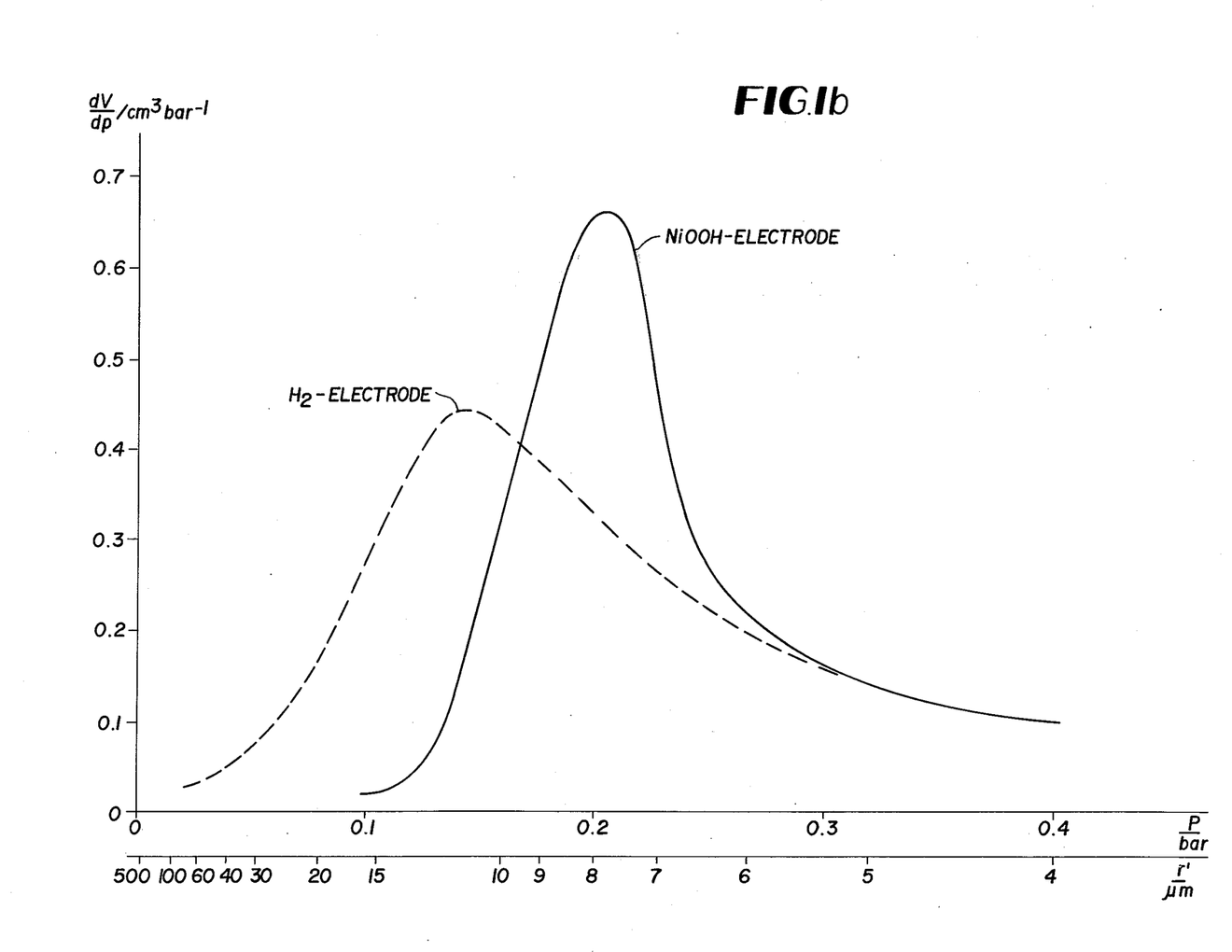
FIG. 1b is a graph, logarithmic scale, of pore distribution for positive and negative electrodes of an embodiment of the present invention.

The separators were saturated with 1.65ml of 6 N KOH before being assembled; the positive electrode was assembled after being wet with electrolyte. The pore distribution of the positive and negative electrodes is shown in FIG. 1b. The pore radius r' and the capillary pressure P are represented on FIG. 1b in a logarithmic scale. The maximum of pore frequency for the negatives was 13 microns, and that of the positives was 7-8 microns. (The pore frequency was measured using the displacement method described in Example 1.)

The cell was then placed in a thick-walled V2A steel pressure container precharged with a hydrogen pressure of 5 bars and sealed. It showed an open circuit voltage of 1.25 Volts. Then the element was charged repeatedly with a 0.7 A current for 5 hours and discharged at 1.5 A, resulting in a discharge time of about 2 hours and a capacity of 2.95–3.04 Ah. The average discharge voltage was 1.26 Volts.

Figure 3:
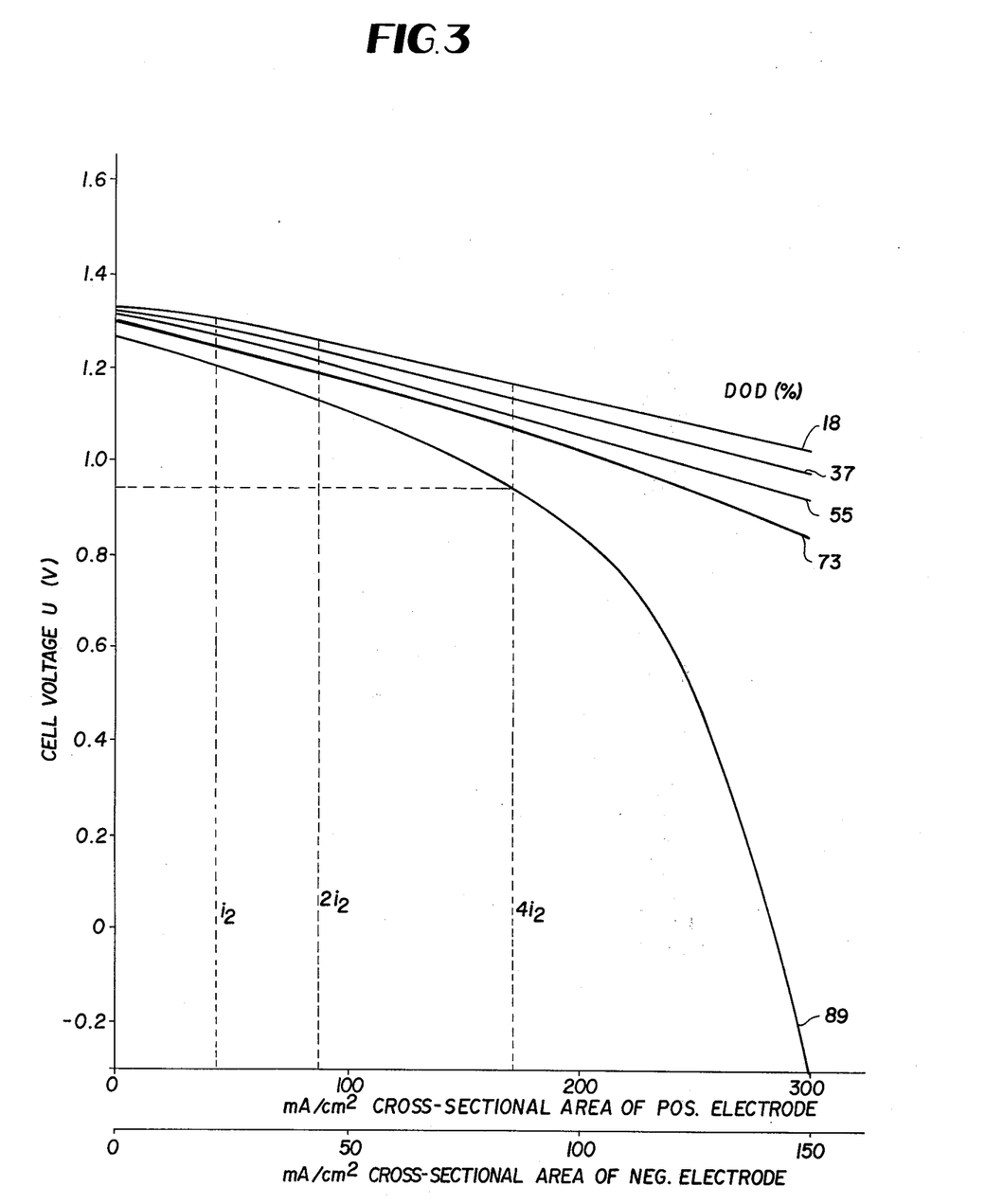
FIG. 3 is a graph of power capacity measured as a function of the depth of discharge for one of the embodiments tested.

During further cycles, the discharge was interrupted with the cell in different discharge states and the cell voltage under load was measured as a function of the depth of discharge (DOD) by pulsed current loading. The results are shown in FIG. 3. It is evident, that even at high depths of discharge (shown as DOD) the cell voltage is fairly stable under loads up to four times the 2 hour discharge current (shown as $4i_2$).

After the measurements the cell was taken apart and the electrolyte content of the components determined: 62% of the electrolyte was in the positive electrode, 7% in the negative electrode and 31% in the separator. This corresponds to an electrolyte filling of the pores of the negatives to 28% while the pores of the positive electrode were nearly completely filled with electrolyte. In all, the free pores of the cell components were 92% filled with electrolyte.

EXAMPLE 3

A cell, consisting of a positive electrode 65mm in diameter and 3 mm thick, prepared from a structure according to German Auslegeschrift No. 2,160,201 by electrochemical impregnation, two negative electrodes 0.6mm thick or sintered nickel structure with a porosity of 78%, activated by 5 mg Pt + Pd/cm$^2$, (1.75mg Pt + 3.75mg Pd), two asbestos separators 67mm in diameter and two corrugated pieces of netting made of polypropylene 69mm in diameter were clamped as shown in FIG. 2b between two perforated acrylic resin plates. The separators were saturated with 1.65ml of 6 N KOH before being assembled, and the positive electrode was moistened with electrolyte before being assembled. The pore distribution of the negative electrodes corresponded approximately to that shown in FIG. 1a, with most of the pores being clustered around 8–10 microns. The pore distribution was measured by the displacement method described in Example 1.

The cell was then placed in a pressure container and exposed to a hydrogen pressure of 5 bars then sealed. it showed an open circuit voltage of 1.25 Volts. Then the element was charged repeatedly with a current of 0.7 ampere for five hours and discharged at 1.5 ampere, whereby the discharge time was approximately two hours and the capacity was 2.95–3.04 Ah. The average discharge voltage was 1.26 Volts.

Additional experiments showed a voltage/current characteristic similar to that measured in the previous example.

A number of positive and negative electrodes with the same diameter were tested using the same arrangement; most of the pore sizes for the negative electrodes were in the 10–25 micron range, with a half-width value range between 3 and 50 microns. Negative electrodes were used for comparative measurements, whose size, pore size distribution and activation corresponded to that in example 2. The positive electrodes had thicknesses of 2.2–4.6 mm, and their capacity per unit cross-sectional area and the nature and concentration of the electrolytes in the cell and the thickness of the asbestos separators are shown in Table 1 below.

| Cell No. | Average NiOOH Electrode (mAh/cm$^2$) | Discharge Voltage (0.5C) (V) | Electrolyte Composition | | | Separator Thickness (mm) |
|---|---|---|---|---|---|---|
| | | | KOH (M/l) | NaOH (M/l) | LiOH (M/l) | |
| 1 | 63.3 | 1.23 | 6 | | | 0.5 |
| 2 | 90.4 | 1.26 | 6 | | | 0.5 |
| 3 | 111.5 | 1.20 | 7.6 | | 0.4 | 0.2 |
| 4 | 132.6 | 1.19 | 7.6 | | 0.4 | 0.5 |
| 5 | 106.4 | 1.06 | 6 | | 0.6 | 0.5 |
| 6 | 67.8 | 1.15 | 3.8 | 3.8 | 0.4 | 0.2 |

| Cell No. | Electrolyte Content in the | | |
|---|---|---|---|
| | Positive wt.% | Separator wt.% | Negative wt.% |
| 1 | 68 | 25 | 7 |
| 2 | 62 | 31 | 7 |
| 3 | 78 | 11 | 11 |
| 4 | 60 | 34 | 6 |
| 5 | 69 | 24 | 7 |
| 6 | 69 | 22 | 9 |

All of the data given above relate to a 2-hour discharge.

The data on Cell 5 were measured after a lifetime of 857 cycles. This cell was charged for five hours with a charging factor (ratio of the amount of current used for charging to that removed) of 1.15, and discharge (0.5C) was interrupted when the cell voltage was 0.65 V.

In Cell 6, the arrangement of the elements in the electrode stack was similar to that in FIG. 2a; the nylon netting was omitted, but the gas-conducting netting located between the two hydrogen electrodes in the middle of the stack was made of metal foam (Retimet 80 N2 made by Dunlop Ltd., Coventry, UK), which, in the form of a 2.3mm thick disc 6.5cm in diameter provided electrically conducting contact with the two negative electrodes.

During operation, a maximum hydrogen pressure of 7–12 bars was created in the test cells, due to the difference in capacity between the positive electrodes employed. By increasing the hydrogen precharge and/or decreasing free gas space by incorporating solid plastic spheres in the test cell housing, tests were carried out with a maximum hydrogen pressure up to 40 bars, which led to an increase in the cell voltage which corresponded to the theory without influencing the function of the cells. All of the measurements were carried out at 20°–25° C.

EXAMPLE 4

The nature of the components of the cell in this example corresponds to Cell No. 2 in Table 1, except that the thickness of the negative electrodes was reduced to 0.5mm. The electrode format was rectangular, and the area was 7.0 × 18.0cm$^2$. The cell contained 8 positives and 16 negatives, the electrode stack was formed from two series-connected blocks of equal capacity, so that the cell voltage was doubled. The following tables give the weights of the components. A cylindrical V2A housing served as the pressure housing for this cell.

| Component | Weight (g) | Weight Percentage (%) |
|---|---|---|
| Positive | 890 | 37 |
| Negative | 260 | 11 |
| Separators | 110 | 4.5 |
| Electrolyte (6N KOH) | 150 | 6 |
| Passive Components (End plate, stack suspension) | 210 | 8.5 |
| Total Stack | 1,620 | (67) |
| Pole Bolts | 70 | 3 |
| Housing | 740 | 30 |
| Total Weight | 2,430 | 100 |

The following data were measured on this cell:

| Charge | 5 | h | 10 A | ( 50 Ah) | |
|---|---|---|---|---|---|
| Discharge | 4.17 | h | 10 A | ( 41.7 Ah) | |
| Av. Disch. Voltage | 2.48 | V | | (103.3 Wh) | 42.5 Wh/kg |
| Volume | 2.4 | liters | | | |
| Pressure | 4–23 | bars | | | |

These results demonstrate the functioning ability of the cells according to the invention. They also show that it is possible by providing a carefully dimensioned pore structure according to the invention with a volume of electrolyte in excess of 90% of the free pore volume of the cell components, to produce nickel oxide hydrogen cells which admit high drain rates with a comparatively low hydrogen working pressure.

It will be obvious to those skilled in the art that various changes may be made without departing from the scope of the invention and the invention is not to be considered limited to what is shown in the drawings and described in the specification.

What is claimed is:

1. In a rechargeable nickel-hydrogen cell with hydrogen pressure storage or hydride storage and one or more electrode units connected electrically in parallel or in series, where in each unit a positive nickel oxide electrode is surrounded on both sides by negative hydrophilic hydrogen electrodes and is separated therefrom by electrolyte-saturated separators, said electrode units comprising gas-permeable electrically conducting or non-conducting separating elements between adjacent negative electrodes, the improvement wherein the averages of the pore sizes of the positives, negatives, and separators are adjusted so that the capillary pressure of the electrolyte in the pores of the positive electrodes in all operating states of the cell is less than the capillary pressure of the electrolyte in the separator and greater than the capillary pressure of the electrolyte in the negative electrode.

2. A cell according to claim 1 wherein the average value of the pore size of the positive electrodes is greater than the average of the pore size of the separators and smaller than the average of the pore size of the hydrophilic negative electrodes.

3. A cell according to claim 2 wherein the free pore volume of the positive electrode is 25–55% and that of the negative electrode 60–85% and the half-width value of the pore size distribution of the negative electrode is between 3.5 and 50 microns.

4. A cell in accordance with claim 3 wherein the half-width value of the pore size distribution of the negative electrode is between 5 and 25 microns.

5. A cell according to claim 1 wherein more than 50% of the total amount of electrolyte contained therein is in the positive electrode.

6. A cell according to claim 5 wherein 50–75% of the total amount of said electrolyte is in the positive electrode.

7. A cell according to claim 1 wherein the separator is composed of asbestos with an average pore size of approximately 0.3–2 microns.

8. A cell according to claim 1 wherein the separating elements between the negative electrodes of adjacent electrode units consist of corrugated plastic netting capable of yielding elastically to pressure exerted vertically upon its surface.

9. A cell according to claim 1 wherein the separating elements between the negative electrodes of adjacent electrode units possess metallic conductivity and consist essentially of metal felt, metal netting or metallized plastic felt or plastic netting, capable of yielding elastically to pressure exerted perpendicularly on their surface, and are in electrical contact with the negative electrodes.

10. A cell according to claim 1 wherein the volume of the pressure housing is 2–8.5 ls/kg of the active mass contained in the positive electrode.

11. A cell according to claim 1 wherein the electrolyte comprises 6–8 moles of KOH and 0.4–0.6 moles of LiOH per 1,000 grams of water.

12. A cell according to claim 1 wherein said electrolyte comprises 7.6 to 8 moles of KOH per 1,000 grams of water.

13. A cell according to claim 1 wherein the electrolyte comprises 6–8 moles of a mixture of KOH and NaOH, and 0.4–0.6 moles of LiOH in 1,000 grams of water.

14. A cell according to claim 1 wherein the capillary pressure of the electrolyte in the pores of the positive electrode is 0.1–1.5 bars, in the pores of the negative electrode 0.03–0.3 bar and in the pores of the separator 1–6 bars.

* * * * *